Nov. 14, 1939. J. R. REYBURN 2,180,097
CALK FOR TIRE CHAINS
Filed March 22, 1937   2 Sheets—Sheet 1
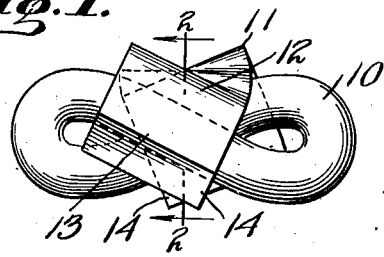
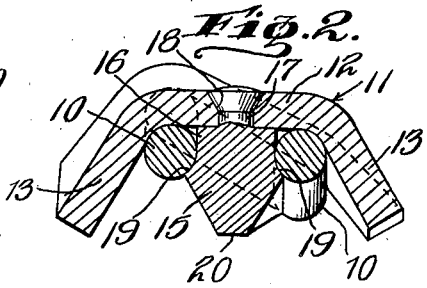
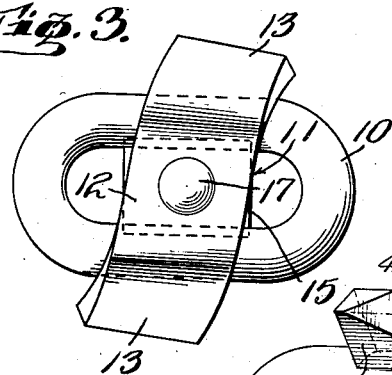
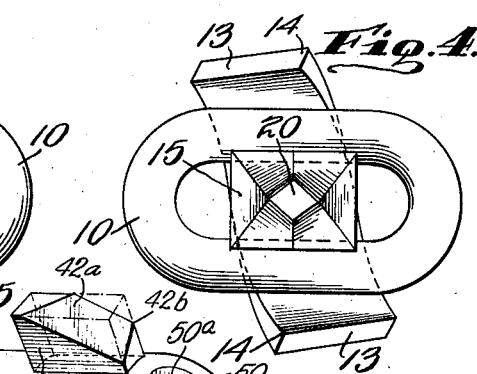
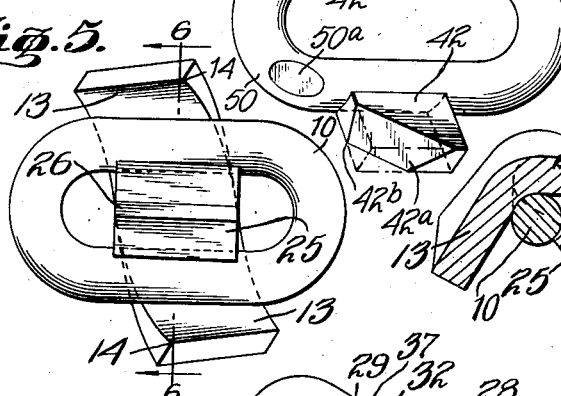
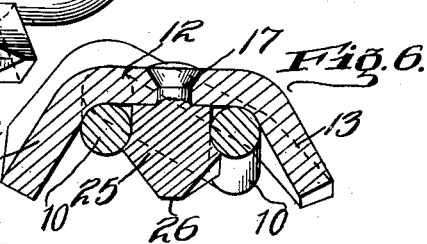
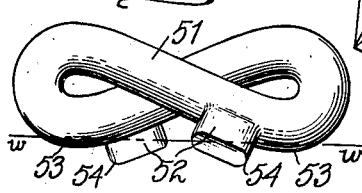
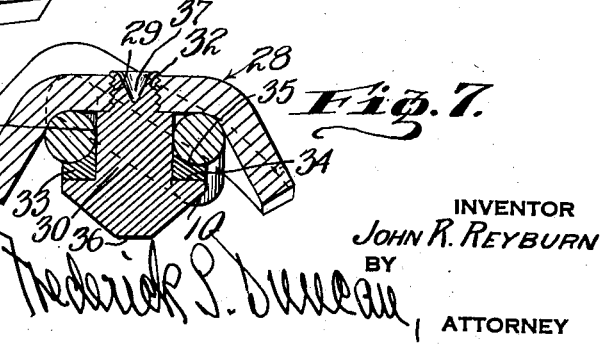
INVENTOR
JOHN R. REYBURN
BY
ATTORNEY

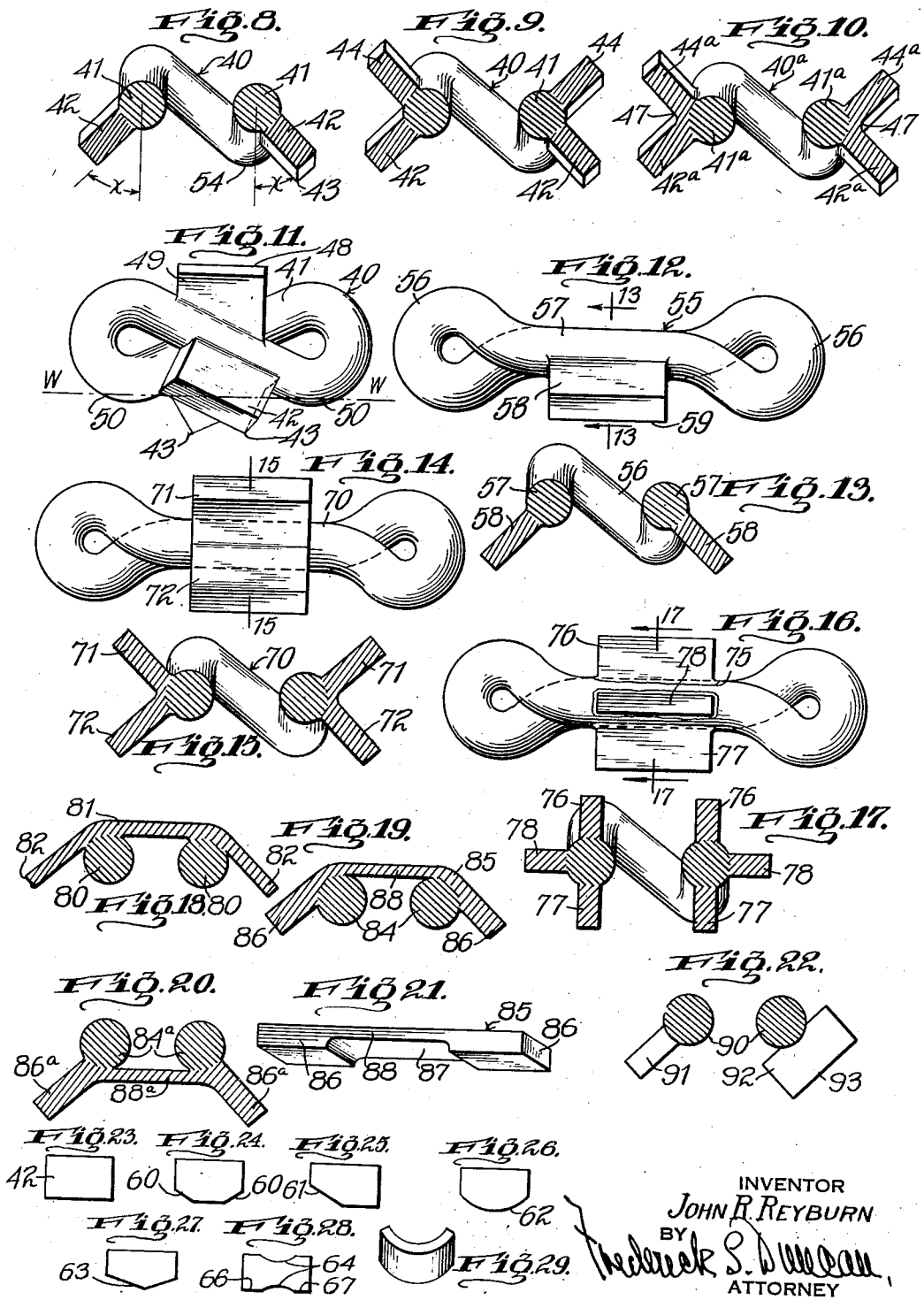

Patented Nov. 14, 1939

2,180,097

UNITED STATES PATENT OFFICE 2,180,097

CALK FOR TIRE CHAINS

John R. Reyburn, Fairfield, Conn., assignor to American Chain & Cable Company, Inc., New York, N. Y., a corporation of New York Application March 22, 1937, Serial No. 132,279

5 Claims. (Cl. 152—245)

The present application is a continuation in part of my co-pending application Serial No. 113,537, filed December 1, 1936, and relates to improvements in Anti-skid tire chains for vehicle wheels.

The primary object of the present invention is to provide a cross chain with tread links having calks secured thereto in such position as to increase the overall width of the links and present projections adapted to dig into slippery surfaces so as to increase traction and prevent skidding.

A more specific object of the invention is to provide the tread links of a cross chain with calks secured thereto in such position that they project downwardly and laterally outwardly from the link. In this specification and the claims the link will be considered as in road-engaging position between the wheel and the road surface, and the "bottom" of the link will be understood to mean the side facing the road while the "top" of the link will be understood to mean the side facing the wheel. Thus, in referring to the calks as projecting downwardly and laterally outwardly from the link it will be understood that they project below the bottom of the link and spread apart from each side of the link forwardly and rearwardly in the normal line of travel of the wheel.

In applying either brakes or engine power to the wheels of a vehicle there is a tendency for the cross chain links to roll as a result of road drag on the bottom of the link and wheel thrust in the opposite direction on the top of the link. This tendency to roll is particularly marked in the case of ordinary curb links which are not much wider than they are deep. The ratio of width to depth is customarily about $\frac{11}{16}$ to ½ and consequently the links offer little resistance to rolling until they twist to the limit allowed by their connections to the side chains. Substantially, the same ratio is present in cross chain links with oppositely twisted ends but whose side strands are substantially parallel, as distinguished from the oppositely inclined side strands of curb links.

The track of a pneumatic tired wheel equipped with the usual curb link cross chains, shows that as the wheel rolls over the chain there is only a slight lift of the tire tread off the road immediately adjacent the chain. The latter sinks into the rubber tread to such an extent that most of the load is supported by direct contact of the tire with the road. When a wheel is locked, traveling for instance on ice, the usual curb type tread link will roll over to or toward an edgewise position. While slightly higher when lying on a side edge, the effective tire contact portion of the chain is narrower, the indent formed in the tire tread is narrower, the area of the indent is correspondingly less, and the depth of this narrow indent develops more readily. As a result, in spite of the fact that the chain is slightly higher when on edge than when lying flat, the tire tread absorbs the chain in the edgewise position about as readily as when the chain is lying flat and the chain is driven into the ice with substantially no greater force than when lying flat.

The gripping force on ice which a chain can exert is dependent, other things being equal, on the force with which it is pressed into the ice. A high penetrating force can be secured by a large conventional chain. In fact, it is possible to use a chain so large that each time it is run over by the tire, the wheel will be lifted to such a degree that its tire will be raised out of contact with the road, and the entire weight of that corner of the car supported by said wheel will press the chain downwardly towards the road. This, however, results in excessive vibration, injuring the car and disturbing the passengers. My invention develops this full weight effect when braking or applying engine power, but in other stages of traveling, representing the big bulk of traveling, approximately only the usual degree of chain vibration is obtained, thereby conserving the automobile and avoiding excessive disturbance to the passengers.

When braking or applying engine power and thereby causing partial rolling of the chain, one calk digs into the roadway as a pivot point, while the opposite calk, swinging about this pivot point, pushes upwardly against the tire and develops a large area indent in the tire, actually tending to lift the wheel. The result is that the weight of the corner of the automobile carried by the wheel reaches the supporting road less directly through the tire tread to the road and more through the indented portion of the tread to the chain and then to the road. Furthermore, because of their outward flare, the calks, even when in a partially rotated position, still extend substantially beyond the profile of the link proper and if properly contoured will dig into the roadway, exerting a more substantial grip than would the chain proper.

In a preferred form of my invention the calks flare apart at a "plowing" angle, that is, at an angle which will cause the calk at the rearward side with respect to the direction of travel when applying power or at the forward side when applying brakes, to dig into an icy road surface even when the link is partially rolled over.

It is within the scope of my invention either to form the calks as integral parts of a chain link, or welding them thereto, or providing them as separate articles of manufacture adapted to be clamped to the cross chain links. In the latter case my invention includes novel means for clamping the calks to the link.

Other objects and advantages will appear in the following description of various embodiments of my invention and thereafter the novelty and scope of the invention will be pointed out in the claims.

In the accompanying drawings:

Figure 1 is a view in side elevation of a chain link of the curb type with the outer portion of a two-piece calk structure applied thereto;

Fig. 2 is a view in transverse section taken on the line 2—2 of Fig. 1, showing both parts of the two-piece calk structure clamped to the link;

Fig. 3 is a top plan view of the device shown in Fig. 2;

Fig. 4 is a bottom plan view of the same;

Fig. 5 is a bottom plan view of a curb link with a modified two-piece calk structure clamped thereon;

Fig. 6 is a view in section taken on line 6—6 of Fig. 5;

Fig. 7 is a similar sectional view of still another form of two-piece calk structure clamped to a curb link;

Fig. 8 is a view in transverse section of a curb link with a plate-like slug or calk welded to each side strand thereof;

Fig. 9 is a similar view showing an upwardly inclined slug as well as a downwardly inclined slug welded to each side strand of the link;

Fig. 10 is a similar view of a somewhat different construction;

Fig. 11 is a view in side elevation of a structure like that of Fig. 9, but in which the outer edge of each upwardly inclined slug is substantially parallel to the longitudinal axis of the link;

Fig. 11A is a bottom plan view of the link shown in Fig. 11, after the link has been worn excessively down in service;

Fig. 11B is a view in side elevation of a curb link provided with plate-like calks of a different form and in different location on the side strands;

Fig. 12 is a view in side elevation of a different form of link with flaring calks welded thereto;

Fig. 13 is a view in section taken on the line 13—13 of Fig. 12;

Fig. 14 is a view in side elevation of a link like that shown in Fig. 12, but with slugs of the type shown in Fig. 10 welded to the side strands thereof;

Fig. 15 is a view in section taken on the line 15—15 of Fig. 14;

Fig. 16 is a view in side elevation of a link with three slugs welded to each side strand thereof;

Fig. 17 is a view in section taken on the line 17—17 of Fig. 16;

Figs. 18, 19 and 20 are views in transverse section of links with calks welded to the side strands thereof, the calks being integrally connected to each other by a portion bridging the side strands;

Fig. 21 is a view in perspective of a calk blank of the type shown in Figs. 19 or 20 before application to the link;

Fig. 22 is a view in transverse section of a link having parallel side strands with one slug disposed in a plane substantially parallel to the longitudinal axis of the link while the other slug is disposed in a plane substantially normal to said axis;

Figs. 23 to 28 inclusive are plan views, respectively, of different forms of slugs that may be welded to the chain links; and Fig. 29 is a view in perspective of a curved slug adapted to be welded to a chain link.

In the drawings, individual links are shown, but it will be understood that they represent elements of a chain and that any desired number of these links may be concatenated to form the tread portion of a cross chain.

The cross chain link 10 shown in Fig. 1 is of the curb type and seated thereon is a sheet metal member 11 of saddle-like form which partly envelops the link. This saddle comprises a body portion 12 and a pair of calk portions 13 which are bent outwardly at a wide angle of about 90 degrees to each other or about 45 degrees with respect to the road surface. The body portion itself is transversely twisted so that it will have a flat bearing upon the oppositely inclined side strands of the curb link. As a result of this twisting, the end portions 13 are skewed, so that each has an outer end edge substantially parallel to the adjacent side strand of the curb link and each presents a projecting corner or spur 14 adapted to dig into the road surface.

The body 12 of the saddle is seated upon the top of the curb link. The saddle is maintained in position by a lug member 15 preferably of rectangular cross-section and having a reduced portion 16, also preferably rectangular, adapted to fit between the side strands of the link. Projecting from the portion 16 is a stud 17 which may be integrally formed on the lug and this lug is adapted to enter and project through an aperture 18 in the overlying saddle. A shoulder 19 is formed on each side of the lug between the main body thereof and the reduced portion 16, and these shoulders bear against the outer or traction side of the link. The shoulders are preferably oppositely inclined to conform to the inclination of the side strands of the curb link. The body of the lug 15 is tapered to form an outwardly projecting blunt diamond point 20, as clearly shown in Fig. 4. The lug and saddle are clamped to the link by riveting the stud 17 in the aperture 18.

An inspection of Fig. 2 will show that the structure has three calk projections adapted to engage the road. However, the point 20 projects farther from the link than do the corners 14, so that the load is concentrated on this point as the link pivots thereon. As explained above, the proportion of the load supported by a tread link depends upon the area of the indentation produced by the link in the rubber tire of the vehicle. The saddle member 11 obviously makes an indentation of greater area than would the bare link. As the link pivots on the point 20 one or other of the spurs 14 will be forced into the road surface, and, because of the flare of the calks 13, this spur will be forced into the road surface at a "plowing" angle so that it will tend to dig into and furrow said surface instead of sliding thereon. If, on applying engine power or brakes, the link tilts further, pivoting on the road-engaging spur 14, it will cause a greater lift of the tire surface than would the bare link, because of the greater overall width provided by the saddle member and because the uplifted calk 13, owing to its broad area, would not as readily be absorbed by the rubber of the tire.

Instead of using a diamond point on the end of the lug the latter may be formed with a blunted chisel edge. Such a lug is shown at 25 in Figs. 5 and 6. This lug has a blunt chisel point 26 which extends lengthwise of the link. In other respects, the lug and saddle may be identical with the construction shown in Figs. 1 to 4 and corresponding parts are therefore, indicated with the same reference numerals.

The chisel edge provides a longer fulcrum bearing than does the diamond point and presents a broader edge to resist side slippage or skidding. When the calk is tipped in service there will be a line contact of the lug on the road surface and a point contact of one of the spurs 14 until the link is rolled sufficiently to rise on the road-contacting spur as a fulcrum.

In order to make the device more conveniently applicable to that anyone can apply the calk assembly to an existing chain, I also provide a structure, such as that shown in Fig. 7. In this case, the saddle 28 is of the same shape as that shown in the other figures, but it has a threaded aperture 29. The lug 30 has a round shank 31 which fits snugly between the side strands of the link 10. Projecting from the free end of the shank is a threaded stud 32 adapted to be screwed into the aperture 29. A washer 33 is fitted between the strands of the link and a shoulder 34 on the lug at the base of the shank. This washer is provided on its upper surface with oppositely inclined grooves 35 in which the inclined side strands of the link are seated. The lug is preferably formed with a blunt diamond point 36, although a blunt chisel point could also be used. The lug is screwed tightly into the saddle to clamp the device to the link and then the projecting end of stem 32 is peened over to prevent the parts from working loose. The stud may be formed with a hole 37 in order to facilitate the peening operation.

If desired, the saddle member may be welded to the curb link in the position shown in Figs. 1 to 3 and the central lug 15 omitted. In such case there would be only the plate-like calks 13 projecting downwardly from the link and flaring laterally outwardly from the link.

In Fig. 8, I show a curb link 40, to the side strands 41 of which a pair of separate calks 42 are welded. These calks are in the form of plate-like slugs and may be cut from a continuous strip of metal, preferably of rectangular cross-section. As shown in the drawings, the calks are inclined downwardly and outwardly from the link, flaring apart at a wide angle to each other. The individual slugs may be of the form shown in plan view of Fig. 23, so that their free edges will parallel the strands to which they are welded. Thus owing to the inclination of the strands, each slug will present a sharp corner or spur 43 at its lowermost end adapted to dig into the road surface.

In Fig. 9, I show a reversible link which differs from the construction shown in Fig. 8 only in having a pair of additional upwardly inclined calks 44; hence, I employ the same reference numerals to designate parts that correspond to those shown in Fig. 8. The link shown in Fig. 9 not only possesses the advantage of being reversible, but also will normally produce a greater indentation in the tire and therefore will take a firmer hold on the road.

Fig. 10 represents a modification of the structure shown in Fig. 9. It consists of a curb link 40a, to each side strand 41a of which a double calk 47 is welded. Each double calk 47 is formed of a strip of metal bent on its median transverse axis to V-shape and then welded to the side strand at the apex of the V in such position that one arm 42a is inclined outwardly from the side of the link in a downward direction, while the other arm 44a is inclined in an upward direction. The resultant structure differs from that of Fig. 9 in providing a somewhat wider spread or overall width of the link and increased strength due to the integral connection of the arms to each other independently of their welded connection to the side strands.

Fig. 11, in side elevation, shows a structure similar to that shown in section in Fig. 9, and corresponding parts are indicated by the same reference numerals. The difference between the two structures is that in Fig. 11 the free edge 48 of the upwardly inclined slug 49 rising from each side strand is parallel to the longitudinal axis of the link, instead of being parallel to the side strand to which it is welded, as in Fig. 9. This link is, therefore, not reversible, but the edges 48 have an extended bearing on the wheel tire adapted to prevent injury to the tire.

Fig. 11 illustrates the relative inclination of the downwardly projecting slugs, as viewed in side elevation, and applies equally well to the corresponding slugs of the structures depicted in Figs. 8, 9, and 10, showing the extent to which the lower corners or spurs 43 project below the main body of the link to dig into the road surfaces. The purpose of the flare of the downwardly projecting slugs shown in Figs. 8 to 11 inclusive is similar to that of the flare of the calks 14 in Figs. 1 to 7 inclusive. However, in the two-piece calk structure there is a central calk upon which the link may teeter and the resultant tractive effect is somewhat different. The link is predisposed to pivot on the central calk sufficiently to bring one or other of the spurs 14 into engagement with the road. In the links shown in Figs. 8 to 11 inclusive the road is normally engaged by both of the spurs 43 conjointly. It will be obvious that by broadening the flare of the calks, and hence the ground engaging transverse span of the link, there will be a greater upward thrust on the tire as the link rolls over to or toward an edgewise position on one or other of the spurs 43 as a fulcrum. However, if the flare is too great the spurs will not lie at a plowing angle and will not dig into a smooth slippery surface, particularly after the spurs have been worn down considerably. The wider the span of the downwardly projecting slugs the greater will be the leverage resisting rolling of the link, and the greater the flare the broader will be the flattened surface as the slug wears down in service. The slugs should be inclined sufficiently to maintain a "plowing" angle even when tilted considerably from normal position. Manifestly, if the slugs were vertically disposed the slightest tilt of the link on one slug as a pivot would dispose the pivot slug at a dragging angle, so that it would not dig into a smooth icy surface. At the other extreme if the slugs were disposed horizontally they would lose their efficiency as calks and serve to aggravate any sliding tendency. I have found that the practical range of inclination of the slugs with respect to their noraml position on a road surface should be between 30 degrees and 60 degrees from the vertical as measured in a plane normal to the longitudinal axis of the link. For instance, in Fig. 8, the angle of inclination $x$ will be found to measure about 45 degrees. It is my experience that such an angle of inclination will give very satisfactory results, and an angle of 40 degrees has proved even more satisfactory. The flare of the upwardly inclined slugs is not so critical, but in the structures shown in Figs. 9 and 10 adapted for a chain that is to be inverted the upwardly projecting slugs should have the same flare as the downwardly projecting slugs.

Fig. 11A is a bottom plan view of the link shown in Fig. 11 after it has been excessively worn down in service, as, for instance, to the plane W—W. In this plan view the tire engaging slugs 49 are omitted so as to avoid confusion. The link thus worn down has a four-point contact with the road provided by the flats 50a on the depending lobes 50 and the flats 42a formed on the slugs 42. To prevent this condition which occurs only in case of an excessive amount of wear, the slugs may be located near the depending lobes instead of being disposed centrally on the side strands. Furthermore, the slugs may be made narrower. Thus, in Fig. 11B, I show a curb link 51 with comparatively narrow slugs 52 welded thereto at the lower ends of the side strands, that is, near the depending lobes 53 of the link. It will be evident that if the link wears down to the plane w—w the link will still have a two-point contact with the road and also the combined areas of contact will be considerably less than those shown in Fig. 11A. Manifestly, the less the area of contact the more will the link dig into the road surface and the better will its tractive effect be.

Referring again to Figs. 11 and 11A it will be noted that when the spurs 43 wear off, sharp points will be formed at 42b which, when the link rolls over, may dig into the tire and damage the same. This difficulty may be overcome by beveling or rounding the corners formed between the outer face of the slug and the side edges thereof, as shown at 54 in Fig. 11B.

The links shown in Figs. 12 to 17 inclusive are of the type having oppositely twisted ends with connecting side strands disposed in parallel relation to the longitudinal axis of the link. Thus, in Fig. 12 the link 55 consists of a closed wire loop comprising oppositely twisted ends 56 connected by substantially parallel side strands 57. To each side strand 57 a plate-like slug 58 is welded and the slugs 58, as shown in Fig. 13, flare apart downwardly and outwardly from the link, in the same way as do the slugs 42 of the links shown in Figs. 8, 9, and 11. In this case, however, the free ends 59 of the slugs parallel the longitudinal axis of the link.

Instead of using rectangular slugs 58 the free ends of the slugs may be shaped to form an angle with the road, either by cutting off the corners, as shown at 60, in Fig. 24, or, cutting off one corner as shown at 61, in Fig. 25, or the free end may be rounded, as shown at 62 in Fig. 26. Another optional form is shown in Fig. 27, wherein the ground engaging end of each slug is cut to form a point 63. In order to make a better weld the slugs may also be of the form shown in Fig. 28. In other words, the slug is formed within a median recess 64 on the side that is to be welded to the link, and this leaves a pair of spaced ears at opposite ends of the slug which are welded to the link strand. This insures a better weld as difficulty sometimes is experienced in forming a uniform weld over an extended joint. For purposes of convenience, the slug shown in Fig. 28 may also be provided with a recess 64 on the opposite edge, so that it will be reversely applicable to the links. The median recess 64 leaves a pair of spurs 66 and 67 adapted to dig into a smooth surface.

It will be understood that all of the various forms of slugs shown in Figs. 23 to 28 inclusive may be applied to curb links as well as to parallel side strand links of the type shown in Fig. 12. Under certain conditions it will be found advisable to use slugs that are curved in the manner shown in Fig. 29. These curved slugs may be applied to straight side strands as well as to side strands that are laterally bulged, as in some forms of cross chain links.

In Figs. 14 and 15, I show a link 70 of the same general type as that shown at 55 in Fig. 12, but the slugs attached to the side strands of the link 70 are substantially of the same form as the slugs 47 shown in Fig. 10. In other words, a V-shaped strip is welded at its V-edge to each side strand to provide an arm 71 that projects outwardly and upwardly from the side strand and another arm 72 that projects outwardly and downwardly from the side strand. The free end edges of these arms 71 and 72 lie parallel to the axis of the side strands and hence parallel the longitudinal axis of the link itself.

In Figs. 16 and 17, I show another link 75 of the parallel side strand type having three slugs welded to each side strand. Two of the slugs 76 and 77 of each set are disposed in vertical alinement, or normal to the plane of the two side strands, but extend in opposite directions from the strand, while the third slug 78 of each set extends outwardly from the link at right angles to the other two slugs. In practice the operation of this link approximates that of the structures shown in Figs. 1–7 inclusive. As the link rolls it will fulcrum first on one of the slugs 77 until it turns far enough to bring the adjacent slug 78 into engagement with the road surface. When supported on both slugs 77 and 78 the slugs 76 and 78 welded to the opposite side strand will engage the tire of the wheel. Obviously, this form of link will have a greater initial tendency to roll than will the structures shown in Figs. 8 to 15 inclusive, but after the link has rolled through an angle of 45 degrees, it will come to a natural resting position and considerably more force must be exerted to continue the roll to a point where it rides solely on a laterally projecting slug 78.

Fig. 18 shows a link 80 with a saddle-like member 81 which spans the side strands of the link and folds over them, extending downwardly and outwardly to form a pair of calks 82 at opposite sides respectively of the link. This saddle member 81 is welded to the side strands and the web bridging the side strands serves to strengthen the link. The structure is similar to that shown in Fig. 1, except that it is applied to a link whose side strands are parallel.

The structure shown in Fig. 19 is very similar to that shown in Fig. 18. It comprises a link 84 of the parallel strand type upon which a saddle member 85 is welded. This member is extended downwardly and outwardly to form a pair of calks 86 disposed respectively at opposite sides of the link. The member 85 is formed, as shown in Fig. 21, of a strip of flat metal provided intermediate its ends with a transverse recess or channel 87. This leaves a web 88 of reduced thickness connecting the ends which form the calks 86. The width of the recess 87 is such that the saddle fits snugly upon the link 84. The end walls of the recess are rounded to the same radius as that of the side strands, so that the calks 86 are in part abutted against the strands.

Instead of applying the saddle member to the top of the link it may be reversely bent and applied to the bottom of the link. Such a construction is shown in Fig. 20, in which, since the parts are substantially the same as those shown in Fig. 19, like parts are indicated with like reference numerals bearing the suffix a. An advantage of the structure shown in Figs. 18 to 20 inclusive is that the side strands of the link are firmly bound together by the saddle member and are thereby reinforced. In the construction shown in Fig. 20 end thrust of the calks is applied more directly against the side strands of the link than in the case of the structure shown in Fig. 19.

In Fig. 22, I show a link 90 of the parallel strand type having a calk welded to each side strand. The calk 91 welded to one of the side strands lies in a plane radial to the longitudinal axis of the strand. The other calk 92, however, is disposed in a plane normal to the longitudinal axis of the adjacent side strand. The calk 91 is a plate-like member of rectangular form and projects downwardly and laterally outwardly from the link at an angle of substantially 45 degrees from the vertical plane. The calk 92 which is of similar rectangular form, is disposed with its outer edge 93 substantially parallel to the plane of the calk 91. The calk 91 acts exactly like the calks 59 of the link shown in Fig. 12, but the calk 93 is disposed in such a plane as to resist sliding of a wheel laterally with respect to its plane of rotation. Links of the type shown in Fig. 22 would preferably be applied to the wheel with the calks 91 on the rearward side with respect to the direction of travel of the wheel. Thus, the calk 91 would be disposed at a "plowing" angle which would cause it to dig into a slippery surface and would also serve as a fulcrum about which the link would turn upon applying engine power to accelerate the vehicle.

I have described above a number of embodiments of my invention, but it will be understood that these are to be taken as illustrative and not limitative and that I reserve the right to make various changes in form, construction, and arrangement of parts without departing from the spirit and scope of my invention as set forth in the claims. In the claims, the inclination of the calks or the angle at which they flare apart will be understood to be measured in a plane normal to the longitudinal axis of the link, but not necessarily normal to the line of intersection of the planes. In the case of a curb link this intersecting line is skewed laterally with respect to the longitudinal axis of the link because of the opposite inclination of the side strands of the link.

I claim:

1. In a cross chain of a tire chain, a curb link, and a saddle member secured to the link and consisting of a body formed with oppositely inclined seats fitted upon the upper faces of the opposite side strands of the curb link and a depending portion at each side of the body projecting below the adjacent side strand, the depending portions of the saddle flaring outwardly and downwardly from the body at a wide angle to each other and forming road engagement projections.

2. In an anti-skid chain, a tread link of the curb type including oppositely inclined side strands and road engaging lobes, and a calk associated with each side strand, said calks diverging and projecting downwardly below the road engaging lobes and laterally beyond the sides of the link.

3. In an anti-skid chain, a tread link of the curb type comprising oppositely inclined side strands and road engaging lobes, and a calk located in the plane of each side strand and secured thereto, said calks diverging and projecting downwardly below the road engaging lobes of the link and laterally beyond the sides of the link.

4. In an anti-skid chain a tread link of the curb type including oppositely inclined side strands and road engaging lobes, a calk secured to each side strand adjacent a ground engaging lobe, said calks diverging and projecting downwardly below the road engaging lobes and laterally beyond the sides of the link, the road engaging faces of said calks extending parallel to the portions of the side strands to which said calks are secured.

5. In an anti-skid chain comprising a plurality of links, each link being of the curb type comprising oppositely inclined side strands and road engaging lobes, and plate-like calks welded edgewise on said oppositely inclined side strands, said calks lying in planes which intersect along a line making an acute angle with the central longitudinal line through the chain.

JOHN R. REYBURN.